J. CHESNEY.
MOTOR SLEIGH.
APPLICATION FILED FEB. 5, 1912.
1,055,609.
Patented Mar. 11, 1913.
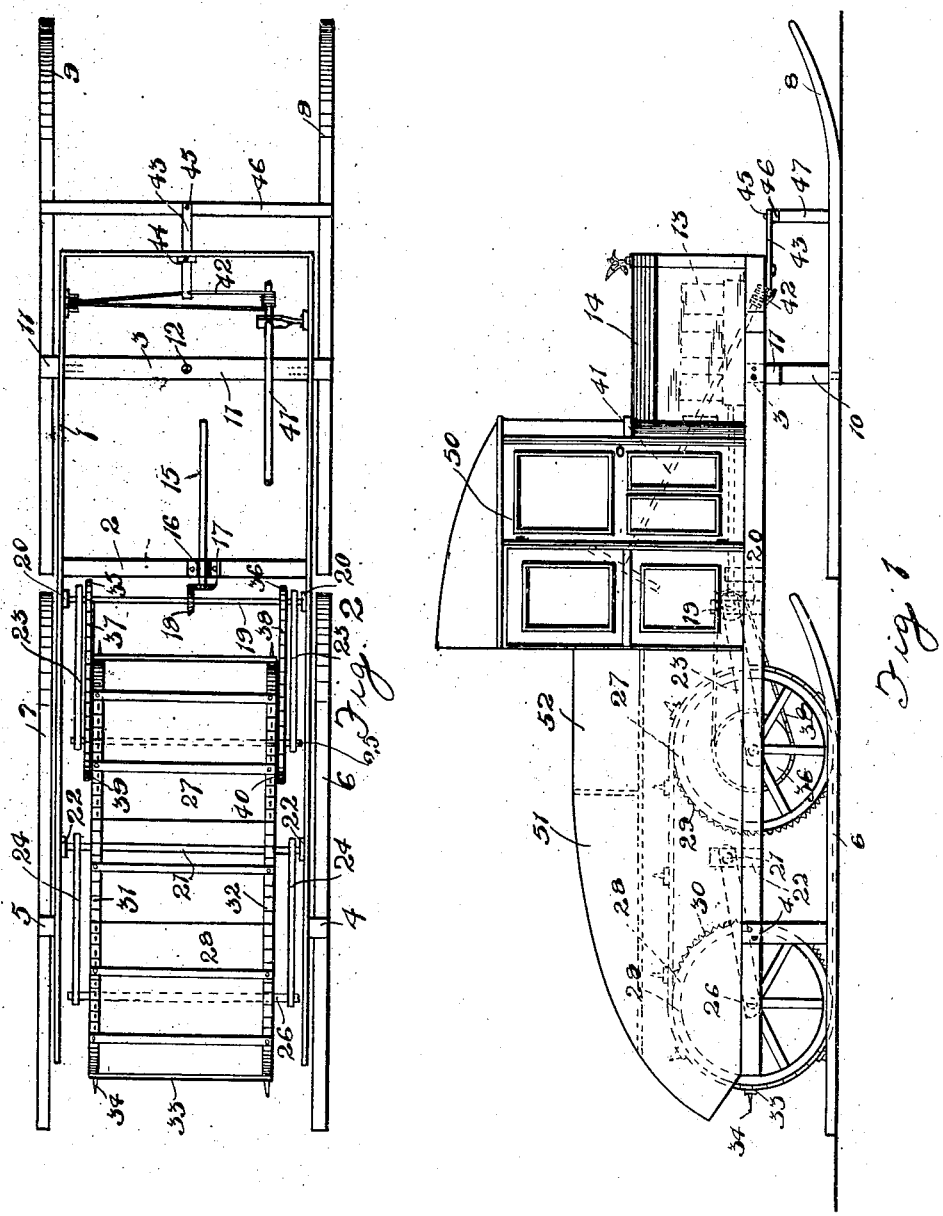

UNITED STATES PATENT OFFICE.

JOHN CHESNEY, OF MELITA, MANITOBA, CANADA.

MOTOR-SLEIGH.

1,055,609.

Specification of Letters Patent. Patented Mar. 11, 1913.

Application filed February 5, 1912. Serial No. 675,626.

*To all whom it may concern:*

Be it known that I, JOHN CHESNEY, of the town of Melita, in the Province of Manitoba, Canada, have invented certain new and useful Improvements in Motor-Sleighs, of which the following is the specification.

My invention relates to a motor propelled sleigh, and the object of the invention is to provide an easily controlled and operated device of this class which can be driven over any roadway on which it is customary for a vehicle to travel, and it consists essentially in a main frame supported forwardly on pivoted runners and rearwardly on stationary runners, a set of drums swung from the frame at the rear, drive chains connecting the drum, means for operating the chains, a steering mechanism for controlling the front runner, and a suitable housing or body mounted on the frame, the parts being arranged and constructed as hereinafter more particularly described.

Figure 1 is a side elevation of the complete sleigh. Fig. 2 is a plan view with the body removed and certain parts broken away.

In the drawing like characters of reference indicate corresponding parts in each figure.

1 represents a substantially rectangular frame having the rear end open, which frame carries suitably located cross beams 2 and 3 for a purpose later described.

4 and 5 represent upright bench posts permanently secured rearwardly to the opposite sides of the frame 1, which posts carry rear runners 6 and 7.

8 and 9 represent the forward runners which are carried by the front bench posts 10 supporting the bench 11 which is pivotally secured by a king bolt 12 to the cross beam 3. An engine 13 is mounted on the frame in the same manner as is customary in automobiles at the present time, the engine being inclosed within a casing 14.

15 represents the engine drive shaft which extends rearwardly on the machine and is supported in a suitable bearing 16 carried by the beam 2. The engine shaft is supplied with a bevel pinion 17 which meshes with a bevel pinion 18 mounted on a counter shaft 19 having the ends thereof supported rotatably in upright brackets 20 carried by the frame.

21 is a cross shaft mounted in suitable brackets 22 extending upwardly from the frame 1. This shaft is considerably to the rear of the shaft 19 and parallel thereto. The shafts 19 and 22 carry forward and rear pairs of hangers 23 and 24, on the ends of which I have mounted drum shafts 25 and 26, the drum shafts being fitted with rotatable drums 27 and 28. The ends of the drums are supplied with chain wheels 29 and 30, respectively, which are connected by chains 31 and 32. Cross slats or bars 33 connect the chains and have their edges flanged at 34. The counter shaft 19 is fitted with chain wheels 35 and 36 connected by chains 37 and 38 with chain wheels 39 and 40 fixed on the drum shaft 25.

41 is a steering post mounted in suitably located brackets carried by the machine, which steering post is equipped with a chain or cable 42 having one end connected directly to the rear end of a lever 43 and the other end passing around a pulley located on the frame, thence directly to the rear end of said lever. The lever 43 is pivoted at 44 to the forward end of the frame 1 and has the forward end thereof pinned at 45 to a cross bar 46 carried by two standards 47 extending upwardly from the runners 8 and 9. A housing or body 50 is mounted on the frame to cover the driver, and the rear part of the machine is closed over with a casing 51 supplied with suitable divisions 52 for carrying luggage.

It will be seen that upon the engine being started the machine is propelled by the drums rotating and carrying with them the chains and their spikes. The fluctuations in the ground over which the machine passes are allowed for by the hangers which permit the drums to rise and fall according to the requirement.

The device is at all times under the control of the steering post, the operation of which will be readily understood.

It will be understood that various steering mechanisms can be applied which would operate to equal advantage to the one described.

What I claim as my invention is:—

In a motor sleigh, the combination with a suitable frame mounted rearwardly and forwardly on runners and carrying an engine supplied with the usual drive shaft, of forward and rear pairs of brackets secured to the frame, a counter shaft pivotally mounted on the forward pair of brackets, and a cross shaft mounted in the rear pair engaging bevel pinions on the engine shaft and counter shaft, pairs of hangers swung within the frame from the counter shaft and the cross shaft, rotatable drums carried by the hangers, chains connecting the drums, cross slats carried by the chains and having flanges turned on the edges thereof, chain wheels on the counter shaft and drum shaft respectively, and a drive chain connecting said chain wheels.

Signed at Melita, Man., this thirtieth day of November 1911.

JOHN CHESNEY.

In the presence of—
MARGARET S. REID,
DEVILL GUILD.